United States Patent
Yana Motta et al.

(10) Patent No.: US 9,169,427 B2
(45) Date of Patent: Oct. 27, 2015

(54) LOW GWP HEAT TRANSFER COMPOSITIONS CONTAINING DIFLUOROMETHANE, A FLUORINATED ETHANE AND 1,3,3,3-TETRAFLUOROPROPENE

(75) Inventors: Samuel F. Yana Motta, East Amherst, NY (US); Mark W. Spatz, East Amherst, NY (US); Christopher J. Seeton, East Amherst, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 13/530,585

(22) Filed: Jun. 22, 2012

(65) Prior Publication Data

US 2013/0015395 A1 Jan. 17, 2013

Related U.S. Application Data

(60) Provisional application No. 61/507,186, filed on Jul. 13, 2011.

(51) Int. Cl.
C09K 5/04 (2006.01)

(52) U.S. Cl.
CPC ............ *C09K 5/045* (2013.01); *C09K 2205/126* (2013.01); *C09K 2205/22* (2013.01)

(58) Field of Classification Search
CPC ............. C09K 5/045; C09K 2205/126; C09K 2205/122
USPC .......................................................... 510/67
See application file for complete search history.

(56) References Cited

U.S. PATENT DOCUMENTS

| 8,075,798 B2 | 12/2011 | Rached |
| 2010/0044619 A1 | 2/2010 | Hulse et al. |
| 2011/0186772 A1 | 8/2011 | Rached |
| 2012/0056123 A1 | 3/2012 | Rached |
| 2012/0096877 A1 | 4/2012 | Yana Motta et al. |

FOREIGN PATENT DOCUMENTS

| CN | 101864276 A | | 10/2010 |
| FR | 2954342 | * | 6/2011 |
| FR | 2959999 | * | 11/2011 |
| WO | 2007144623 A1 | | 12/2007 |
| WO | 2009/089511 A2 | | 7/2009 |
| WO | 2011101617 A2 | | 8/2011 |
| WO | 2011161419 A1 | | 12/2011 |

OTHER PUBLICATIONS

R.C. Downing, Fluorocarbon Refrigerants Handbook, Chapter 3, Prentice-Hall, (1988) US.
SAE International, Standard No. J2765, Procedure for Measuring System COP of a Mobile Air Conditioning System on a Test Bench, Oct. 2008, US.

* cited by examiner

*Primary Examiner* — John Hardee
(74) *Attorney, Agent, or Firm* — Colleen D. Szuch

(57) ABSTRACT

Heat transfer compositions, methods and use wherein the composition comprising: (a) from about 5 to about 20% by weight of HFC-32; (b) from about 70% to about 90% by weight of HFO-1234ze; and (c) from about 5% to less than about 20% by weight of HFC-152a and/or HFC-134a.

17 Claims, 1 Drawing Sheet

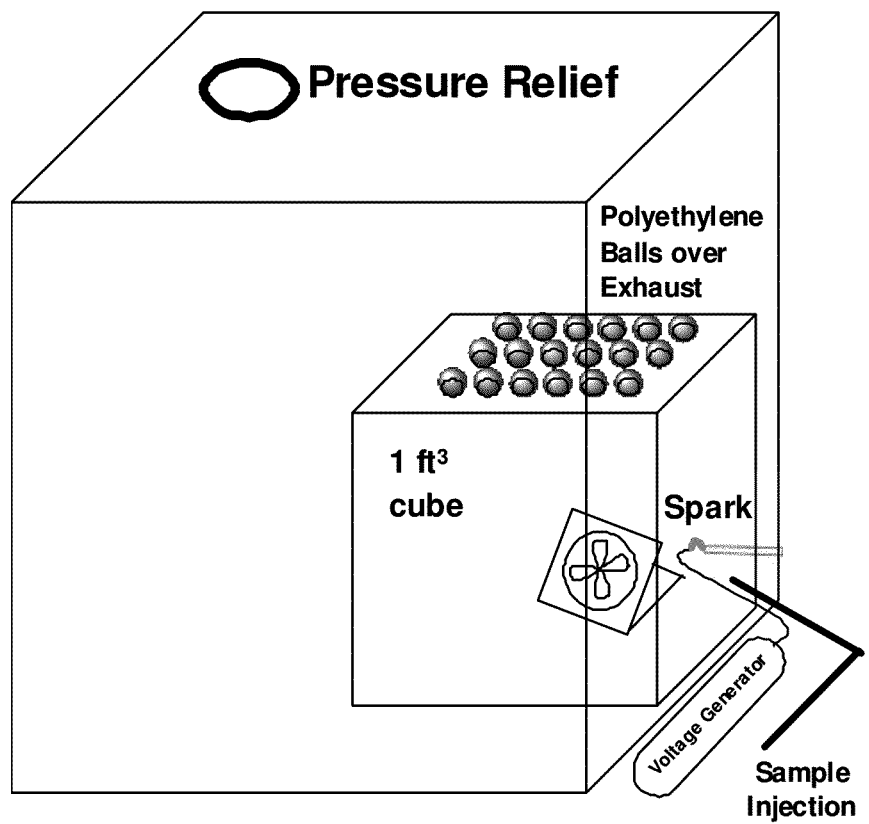

LOW GWP HEAT TRANSFER COMPOSITIONS CONTAINING DIFLUOROMETHANE, A FLUORINATED ETHANE AND 1,3,3,3-TETRAFLUOROPROPENE

CROSS REFERENCE TO RELATED APPLICATIONS

The present application claims priority to U.S. Provisional Patent Application No. 61/507,186, filed on Jul. 13, 2011, the contents of which are incorporated herein by reference.

FIELD OF THE INVENTION

This invention relates to compositions, methods and systems having utility in numerous applications, including particularly heat transfer systems such as refrigeration systems. In preferred aspects, the present invention is directed to refrigerant compositions particularly well adapted for use in applications in which the refrigerant 1,1,1,2-tetrafluoroethane (HFC-134a) was previously and frequently used, including particularly for heating and/or cooling applications, and for retrofitting refrigerant and/or air conditioning systems, including systems designed for use with HFC-134a. The preferred use of such compositions is stationary refrigeration and air conditioning equipment.

BACKGROUND

During the course of the past several years, substantial effort has been devoted to developing more environmentally friendly alternatives to materials which had previously been frequently used for refrigeration and air conditioning purposes. During this time, the main refrigerant used for mobile air conditioning (MAC) systems had been HFC-134a. Although HFC-134a possesses many properties that make it attractive for use in MAC systems, it has a relatively high global warming potential (GWP) of about 1430 (100 years).

The fluorinated olefin HFO-1234yf has emerged after much research and development effort by the assignee of the present invention as the material of choice to replace HFC-134a in MAC systems. The emergence of HFO-1234yf as the next-generation material of choice for MAC systems is due primarily to its exceptional ability to provide a combination of difficult to achieve properties, such as excellent heat transfer characteristics, low toxicity, low flammability, and chemical stability, among other properties. Furthermore, HFO-1234yf is capable of providing this combination of properties with little or no need to be blended with other materials.

Despite the exceptional and extraordinary success of HFO-1234yf as the next generation refrigerant for many applications, including particularly MAC systems, the present applicants have come to appreciate that circumstances may arise in which HFO-1234yf is not readily available as a result of production capacity limitations, especially in the near term. Accordingly, applicants have come to recognize the need for the development of other materials which might approach the commercial success of HFO-1234yf as the next generation refrigerant.

Prior to and subsequent to the development of HFO-1234yf, much of the effort directed toward next-generation refrigerants was focused on the development of heat transfer compositions comprised of a blend or mixture of two or more components. However, these efforts have thus far been generally less than fully successful because of a failure to fully realize one or more of the myriad of properties required for a successful next generation refrigerant.

The fluorinated olefin 1,3,3,3-tetrafluoropropene (HFO-1234ze) has also been identified in an application assigned to the assignee of the present invention as a next generation refrigerant due to its advantageous combination of properties. See, for example, WO 2009/089511. While this application discloses that HFO-1234ze is very attractive as a refrigerant in many applications, it also reveals that it has a substantially lower capacity relative to HFC-134a than does HFO-1234yf in certain air conditioning applications when each is used as the sole refrigerant.

Blends comprising such fluorinated olefins (e.g. 1234ze or 1234yf) have been suggested for use in a wide variety of applications, including heat transfer compositions. For example, WO 2009/089511, discloses blends comprising as a first component one or more fluorinated olefins according to a particular structure and a second component selected from a list of compounds comprising chlorofluorocarbons (CFCs), hydrofluorocarbons (HFCs) water and CO2. However, the specific combination of components in the particular concentration ranges required by the present invention are not disclosed, and no particular combination of these components is identified in WO 2009/089511 as having the advantageous and beneficial properties described herein.

US Application No. 2010/0044619, which is also assigned to the assignee of the present invention, discloses blends comprising fluorinated olefins for use in connection with heat transfer compositions. This application describes blends comprising as a first component dichloromethane (HFC-32), second component comprising multi-fluorinated olefins having from 2 to 5 carbon atoms, and optionally a third component selected from fluorinated alkanes having to 2 to 3 carbon atoms, CF3I, and combinations of these. According to this application, the second and/or third component of the blend is incorporated for the purpose of acting as of an agent for reducing the flammability of the material relative to HFC-32 alone. Once again, however, the specific combination of components in the particular concentration ranges required by the present invention are not disclosed, and no particular combination of these components is identified in US Application No. 2010/0044619 as having the advantageous and beneficial properties described herein.

Although it is believed that the blends of materials disclosed in the above-noted applications are generally acceptable for use in heat transfer applications under certain circumstances, applicants have found that unexpected yet highly beneficial advantages can be achieved by careful selection of materials within a specific concentration range for forming a heat transfer composition blend which is at once capable of achieving highly desirable heat transfer properties, extraordinarily beneficial environmental properties and exceptionally and unexpectedly nonhazardous compositions from the standpoint of combustion ignition.

The burning velocity of a material is one measure that has heretofore been used to assess the hazardousness of the material from a flammability or explosive nature stand point. Thus it has heretofore been considered in many applications that a material having a burning velocity below a value of 10 (measured as described hereinafter), is not only important or essential for many applications, but also that such a material would be considered generally a non-hazardous material from a flammability or explosive nature stand point. Applicants have found that certain compositions exhibit an undesirably high level of hazardousness even when such compositions contain components that would indicate that the material is acceptable for use from a burning velocity stand-point, as discussed more fully hereinafter.

SUMMARY

Applicants have found that heat transfer compositions having highly desirable heat transfer and environmental properties can be produced which also have an unexpectedly advantageous level of safety or non-hazardousness from the standpoint of flammability/combustion impact. More specifically, applicants have found that great but unexpected advantages can be achieved by the use of compositions comprising HFO-1234ze, HFC-32 and a third component selected from HFC-152a, HFC-134a and combinations of these.

For embodiments in which the third component comprises HFC-152a, it is important in many applications that the amount of HFC-152a is less than about 20% by weight of the composition, and even more preferably that the amount of HFC-152a is not greater than about 15% by weight of the composition, and also preferably not less than about 5% of the composition. In this regard, applicants have found that concentrations of HFC-152a of greater than about 20% in such compositions produce compositions with an undesirably high level of hazardousness notwithstanding that such compositions having 20% or greater of HFC-152a would be expected to have a burning velocity of less than about 10. Thus, applicants have surprisingly found that tremendous advantage can be achieved by requiring such compositions to contain less than about 20% by weight of HFC-152a.

Applicants have also found that the use of HFC-152a in amounts of about 5% or less have the undesirable effect of increasing the evaporation glide of the blend to such a degree that the use of such blends becomes highly problematic in certain applications, as explained more fully below.

For embodiments in which the third component comprises HFC-134a, it is important in many applications that the amount of HFC-134a is less than about 6% and greater than about 3% by weight of the composition, and even more preferably that the amount of HFC-134a is not greater than about 5% by weight of the composition, and also preferably not less than about 4% of the composition. In this regard applicants have found that concentrations of HFC-134a of greater than about 6% by weight in such compositions produce compositions with an undesirably high level of global warming potential, while compositions with amounts of less than about 3% by weight have capacity and/or COP that diverges greater than a desired about relative to pure HFC-134a. In such compositions, it is also preferred that the amount of R-32 in the compositions is from about 7% to about 15% by weight, more preferably from about 8% to about 12% by weight, while the HFO-1234ze(E) is present in the composition in an amount of from about 83% to about 88% by weight, and even more preferably of from about 84% to about 87% by weight. Thus, applicants have surprisingly found that tremendous advantage can be achieved in certain embodiments by requiring such compositions to have each of the components R-32, HFO-1234ze(E) and HFC-134a in the amounts described herein. As used herein unless otherwise indicated, weight percentages for such aspects of the invention are based upon weight percent of R-32, HFO-1234ze and HFC-134a in the composition.

In preferred aspects, the heat transfer compositions, methods, uses and systems of the present invention comprise or utilize a multi-component mixture comprising: (a) from about 70% to about 90% by weight of HFO-1234ze, preferably transHFO-1234ze (also referred to as HFO-1234ze(E)); (b) from about 5% to about 20% by weight of HFC-32, (c) from greater than about 5% to less than about 20% by weight of HFC-152a; and (d) optionally HFC-134a in an amount of from 0% to less than about a 5%. As used herein unless otherwise indicated, weight percentages are based upon weight percent based on the total amount of components (a), (b), (c) and (d) present in the composition.

In preferred aspects, the heat transfer compositions, methods, uses and systems of the present invention comprise or utilize a multi-component composition comprising: (a) HFO-1234ze, preferably transHFO-1234ze; (b) HFC-32, (c) HFC-152a, and optional components (d), including particularly HFC-134a, with the relative amounts of each component (a)-(d) in the composition being effective to provide said composition with a GWP (as hereinafter defined) of not greater than 150, and even more preferably not greater than about 100, and an ignition hazard level (as hereinafter defined) of not greater than about 7, even more preferably not greater than about 5, and even more preferably not greater than about 2. In such embodiments it is also generally preferred that the composition has a burning velocity (as hereinafter defined) of not greater than about 10.

In certain preferred embodiments, the compositions of the present invention have a relative amount of each component (a)-(d) effective to provide said composition with a capacity relative to HFC-134a under MAC conditions (as hereinafter defined) of from about 90% to about 105%, and even more preferably from about 95% to about 101%, and a COP relative to HFC-134a under MAC condition (as hereinafter defined) for from about 98% to about 102%, more preferably of about 100%.

In certain preferred embodiments, the compositions of the present invention have a relative amount of each component (a)-(d) effective to provide said composition with a Evaporator Glide (as hereinafter defined) of not greater than about 8, and even more preferably not greater than about 7.

In certain highly preferred embodiments, the present invention comprises or utilizes a multi-component composition comprising: (a) HFO-1234ze, preferably transHFO-1234ze; (b) HFC-32, (c) HFC-152a, and optionally (d) HFC-134a, with the relative amount of each component (a)-(d) in the composition being effective to provide said composition with: (i) a GWP (as hereinafter defined) of not greater than 150, and even more preferably not greater than about 100; (ii) an ignition hazard level (as hereinafter defined) of not greater than about 7, even more preferably not greater than about 5, and even more preferably not greater than about 2; (iii) a capacity relative to HFC-134a under MAC conditions (as hereinafter defined) of from about 90% to about 105%, and even more preferably from about 95% to about 101%; (iv) a COP relative to HFC-134a under MAC condition (as hereinafter defined) for from about 98% to about 102%, more preferably of about 100%; and (v) a Evaporator Glide (as hereinafter defined) of not greater than about 8, and even more preferably not greater than about 7.

The present invention provides also methods and systems which utilize the compositions of the present invention, including methods and systems for heat transfer and for retrofitting existing heat transfer systems. Certain preferred method aspects of the present invention relate to methods of providing cooling in small refrigeration systems. Other method aspects of the present invention provide methods of retrofitting an existing small refrigeration system designed to contain or containing R-134a refrigerant comprising introducing a composition of the present invention into the system without substantial engineering modification of said existing refrigeration system. According to certain highly preferred aspects of the present invention, the refrigeration system and/ or refrigeration methods and/or the refrigerant compositions of the present invention are directed to mobile air conditioning systems, and even more preferably automotive air conditioning systems, and even more preferably air-conditioning systems contained in or used in connection with passenger cars.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

BRIEF DESCRIPTION OF THE FIGURES

FIG. 1 illustrates a schematic depiction of the experimental setup for testing of tubular heaters.

DETAILED DESCRIPTION OF PREFERRED EMBODIMENTS

Small refrigeration systems are important in many applications, as mentioned above. In such systems, one of the refrigerants that have been commonly used is HFC-134a, which has an estimated Global Warming Potential (GWP) of 1430. Applicants have found that the compositions of the present invention satisfy in an exceptional and unexpected way the need for alternatives and/or replacements for refrigerants in such applications, particularly and preferably HFC-134a, that at once have lower GWP values and provide non-flammable, non-toxic fluids that have a close match in cooling capacity and/or efficiency (and preferably both) to HFC-134a in such systems. Applicants have found that the compositions of the present invention satisfy in an exceptional and unexpected way the need for new compositions, especially for small and medium refrigeration applications, having improved performance with respect to environmental impact while at the same time providing other important performance characteristics, such as capacity, efficiency, flammability and toxicity. In preferred embodiments the present compositions provide alternatives and/or replacements for refrigerants currently used in these applications, particularly and preferably HFC-134a, that at once have lower GWP values and provide a refrigerant composition that has a degree of hazardousness, as defined hereinafter, that is substantially lower than the hazardousness of similar compositions but comprising greater than 20% of HFC-152a, while at the same time maintaining a desirably low toxicity, and preferably also having a close match in cooling capacity and/or efficiency to HFC-134a in such systems.

Heat Transfer Compositions

The compositions of the present invention are generally adaptable for use in heat transfer applications, that is, as a heating and/or cooling medium, but are particularly well adapted for use, as mentioned above, in low and medium temperature refrigeration systems, and in automotive AC systems, that have heretofore used HFC-134a.

Applicants have found that use of the components of the present invention within the stated ranges is important to achieving the highly advantageous combinations of properties exhibited by the present compositions, particularly in the preferred systems and methods, and that use of these same components but substantially outside of the identified ranges can have a deleterious effect on one or more of the important properties of the compositions of the invention.

In certain preferred embodiments, the multi-component mixture comprises: (a) from about 5% to about 15% by weight of HFC-32; and (b) from about 70% to about 85% by weight of HFO-1234ze, preferably transHFO-1234ze; and (c) greater than 5% to about 18% by weight of HFC-152a.

In certain preferred embodiments, the multi-component mixture comprises: (a) from about 5% to about 10% by weight of HFC-32; and (b) from about 70% to about 80% by weight of HFO-1234ze, preferably transHFO-1234ze; and (c) greater than 5% to about 15% by weight of HFC-152a.

As mentioned above, the preferred compositions exhibit a degree of hazard value of not greater than about 7. As used herein, degree of hazardousness is measured by observing the results of a cube test using the composition in question and applying a value to that test as indicated by the guidelines provided in the following table below:

HAZARD VALUE GUIDELINE TABLE

| TEST RESULT | HAZARD VALUE RANGE |
|---|---|
| (No ignition). Exemplary of this hazard level are the pure materials R-134a and transHFO-1234ze. | 0 |
| Incomplete burning process and little or no energy imparted to indicator balls and no substantial pressure rise in the cube (all balls rise an amount that is barely observable or not all from the cube holes and essentially no movement of the cube observed). Exemplary of this hazard level is the pure material HFO-1234yf, with a value of 2. | 1-2 |
| Substantially complete burning process and low amount of energy imparted to some of the balls and substantially no pressure rise in the cube (some balls rise an observable small distance and return to the starting position, and essentially no movement of the cube observed). Exemplary of this hazard level is the pure material R-32, with a value of 4. | 3-5 |
| Substantially complete burning process and substantial amount of energy imparted to most balls and high pressure rise in the cube but little or no movement of the cube (most balls rise an observable distance and do not return to the top of the cube, but little or no movement of the cube observed). | 6-7 |
| High Hazard Conditions—Rapid burning and substantial imparted to all balls and substantial energy imparted to the cube (substantially all balls rise from the cube and do not return to the starting position, and substantial movement of the cube observed). Exemplary of this hazard level are the pure materials R-152a and R-600a, with values of 8 and 10 respectively. | 8-10 |

The cube test is conducted as indicated in the Examples below.

As mentioned above, applicants have found that the compositions of the present invention are capable of achieving a difficult combination of properties, including particularly: low GWP; excellent capacity relative to HFC-134a; excellent efficiency relative to HFC-134a; an evaporator condition glide of less than about 8; and a hazard value of not greater than 7, and preferably of about 5 or less. By way of non-limiting example, the following Table A illustrates the substantial GWP superiority of certain compositions of the present invention, which are described in parenthesis in terms of weight fraction of each component, in comparison to the GWP of HFC-134a, which has a GWP of 1430.

TABLE A

| Group | # | Composition | GWP | BV cm/s |
|---|---|---|---|---|
| 32 + 152a + 1234ze | A1 | R32/R152a/1234ze(E)(0.1/0.15/0.75) | 91 | 4.1 |
| | A2 | R32/R152a/1234ze(E)(0.08/0.15/0.77) | 77 | 4.0 |
| | A3 | R32/R152a/1234ze(E)(0.06/0.15/0.79) | 64 | 3.9 |
| 32 + (152a + 134a) + 1234ze | B1 | R32/R152a/1234ze(E)/R134a(0.09/0.15/0.72/0.04) | 141 | 4.6 |
| | B2 | R32/R152a/1234ze(E)/R134a(0.08/0.15/0.73/0.04) | 134 | 4.5 |
| | B3 | R32/R152a/1234ze(E)/R134a(0.07/0.15/0.74/0.04) | 127 | 4.5 |
| 32 + 134a + 1234ze | B4 | R32/1234ze(E)/R134a(0.105/0.85/0.045) | 140 | 1.3 |
| | B5 | R32/1234ze(E)/R134a(0.1/0.855/0.045) | 137 | 1.3 |
| | B6 | R32/1234ze(E)/R134a(0.095/0.86/0.045) | 134 | 1.3 |
| 32 + 152a + 1234ze (BV < 10 but hazardous) | C1 | R32/R152a/1234ze(E)(0.1/0.2/0.7) | 97 | 5.3 |
| | C2 | R32/R152a/1234ze(E)(0.1/0.3/0.6) | 109 | 7.6 |

The refrigerant compositions of the present invention may be incorporated into heat transfer compositions which include not only the refrigerant having the required and optional components for the refrigerant, but which also includes other components for the purpose of enhancing or providing certain functionality to the composition, or in some cases to reduce the cost of the composition. For example, heat transfer compositions according to the present invention, especially those used in vapor compression systems, include in addition to components (a)-(d) as mentioned above, but also a lubricant, generally in amounts of from about 30 to about 50 percent by weight of the composition, based on the total of the refrigerant composition and the lubricant, and in some cases potentially in amount greater than about 50 percent and other cases in amounts as low as about 5 percent by weight.

Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-134a. The preferred compositions of the present invention tend to exhibit many of the desirable characteristics of R-134a but have a GWP that is substantially lower than that of R-134a while at the same time having a capacity and/or efficiency (as measured by COP) that is substantially similar to or substantially matches, and preferably is as high as or higher than R-134a. In particular, applicants have recognized that certain preferred embodiments of the present compositions tend to exhibit relatively low global warming potentials ("GWPs"), preferably less than about 150, and more preferably not greater than about 100, while at the same time achieving a hazard value of less than about 7, and even more preferably of not greater than about 5.

As mentioned above, the present invention achieves exceptional advantages in connection with systems known as low temperature refrigeration systems. As used herein the term "low temperature refrigeration systems" refers to vapor compression refrigeration systems which utilize one or more compressors and a condenser temperature of from about 35° C. to about 75° C. In preferred embodiments, the systems have an evaporator temperature of from about 10° C. to about −35° C., with an evaporator temperature preferably of about −10° C. Moreover, in preferred embodiments, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 1° C. to about 15° C., with a degree of superheat in the suction line preferably of from about 5° C. to about 10° C.

Another preferred system of the present invention is referred to herein as a "automotive AC or MAC systems." Such systems have an evaporator temperature of from about 0° C. to about 20° C. and a CT of from about 30° C. to about 95° C. Moreover, in preferred embodiments of such systems, the systems have a degree of superheat at evaporator outlet of from about 2° C. to about 10° C., with a degree of superheat at evaporator outlet preferably of from about 4° C. to about 7° C. Furthermore, in preferred embodiments of such systems, the systems have an increase of temperature in the suction line of from about 0.5° C. to about 5° C., with an increase of temperature in the suction line preferably of from about 1° C. to about 3° C.

As mentioned above, the present invention also achieves exceptional advantage in connection with systems known as medium temperature refrigeration systems. As used herein the term "medium temperature refrigeration system" refers to vapor compression refrigeration systems which utilize one or more compressors and a condenser temperature of from about 35° C. to about 75° C. In preferred embodiments of such systems, the systems have an evaporator temperature of from about 10° C. to about −35° C., with an evaporator temperature preferably of about −10° C. Moreover, in preferred embodiments of such systems, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 1° C. to about 15° C., with a degree of superheat in the suction line preferably of from about 5° C. to about 10° C.

EXAMPLES

The following examples are provided for the purpose of illustrating the present invention but without limiting the scope thereof.

Compositions Tested

The following compositions within the scope of the present invention are the utilized in the examples which follow:

| COMPOSITION DESIGNATION | wt % transHFO-1234ze | Wt % HFC-32 | Wt % HFC-152 | Wt % 134a |
|---|---|---|---|---|
| A1 | 75 | 10 | 15 | 0 |
| A2 | 77 | 8 | 15 | 0 |
| A3 | 79 | 6 | 15 | 0 |
| B1 | 72 | 9 | 15 | 4 |
| B2 | 73 | 8 | 15 | 4 |
| B3 | 74 | 7 | 15 | 4 |
| B4 | 85 | 10.5 | 0 | 4.5 |
| B5 | 85.5 | 10 | 0 | 4.5 |
| B6 | 86 | 9.5 | 0 | 4.5 |
| C1 | 70 | 10 | 20 | 0 |
| C2 | 60 | 10 | 30 | 0 |

Example 1

Auto AC Conditions

This example illustrates the performance of embodiments A1-A3 and B1-B3 of the present invention when used as a replacement for HFC-134a in a auto AC refrigerant systems. The system is one have an evaporator temperature (ET) of about 4° C., with a degree of superheat at the evaporator outlet of about 5° C., and condenser temperature (CT) of about 60° C., with about 5° C. subcooling. The system has a degree of superheat at the suction line of about 10° C. and an efficiency of about 70%.

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

The properties of each composition and its performance in the exemplary auto AC system is observed to be as follows these operating parameters are reported in the table below, with the performance based upon HFC-134a having a COP value of 1.00 and a capacity value of 1.00:

| | Composition | GWP | Cap % of 134 | Eff % of 134 (COP) | Ev Full Glide C. | BV cm/s | Hazard Value |
|---|---|---|---|---|---|---|---|
| A1 | R32/R152a/1234ze(E)(0.1/0.15/0.75) | 91 | 100% | 101% | 7.38 | 4.1 | 4 |
| A2 | R32/R152a/1234ze(E)(0.08/0.15/0.77) | 77 | 97% | 101% | 6.55 | 4.0 | 4 |
| A3 | R32/R152a/1234ze(E)(0.06/0.15/0.79) | 64 | 93% | 101% | 5.50 | 3.9 | 4 |
| B1 | R32/R152a/1234ze(E)/R134a(0.09/0.15/0.72/0.04) | 141 | 100% | 101% | 675 | 4.6 | 4 |
| B2 | R32/R152a/1234ze(E)/R134a(0.08/0.15/0.73/0.04) | 134 | 98% | 101% | 6.32 | 4.5 | 4 |
| B3 | R32/R152a/1234ze(E)/R134a(0.07/0.15/0.74/0.04) | 127 | 96% | 101% | 5.85 | 4.5 | 4 |

The EV full glide is determined by taking the deference between the bubble point and dew under evaporating conditions of the system.

The Hazard Value is determined as described above using the Cube Test. The Cube Test is performed pursuant to the procedure described herein. Specifically, each material being tested is separately released into a transparent cube chamber which has an internal volume of 1 ft3. A low power fan is used to mix components. An electrical spark with enough energy to ignite the test fluids is used. The results of all tests are recorded using a video camera. The cube is filled with the composition being tested so as to ensure a stoichiometric concentration for each refrigerant tested. The fan is used to mix the components. Effort is made to ignite the fluid using the spark generator for 1 min. Record the test using HD camcorder.

A schematic of the experimental setup for testing of tubular heaters is illustrated in FIG. 1.

Example 2

Auto AC Conditions

This example illustrates compositions within the scope of certain aspects of the present invention, namely compositions B4-B6 which do not contain HFC-152a, but which do contain HFC-134a using an auto AC system operated is in Example 1. The results are reported in the following table:

| | Composition | GWP | Cap % of 134 | Eff % of 134 (COP) | Ev Full Glide C. | BV cm/s | Hazard Value |
|---|---|---|---|---|---|---|---|
| B4 | R32/1234ze(E)/R134a(0.105/0.85/0.045) | 140 | 99% | 99% | 9.19 | 1.3 | 0.5 |
| B5 | R32/1234ze(E)/R134a(0.1/0.855/0.045) | 137 | 97% | 99% | 9.00 | 1.3 | 0.5 |
| B6 | R32/1234ze(E)/R134a(0.095/0.86/0.045) | 134 | 96% | 99% | 8.80 | 1.3 | 0.5 |

As can be seen from the results reported above, the compositions which do not contain HFC-152a but which contain HFC-134a in accordance with the teachings contained herein show an excellent but unexpected combination of properties, including low GWP, low burning velocity and hazard value and excellent capacity and COP. The glide of such compositions may be higher than desired for some applications, but is acceptable for many applications.

Comparative Example C1

Auto AC Conditions

This example illustrates the performance of the compositions outside the scope of the present invention, namely compositions C1 and C2, using an auto AC system operated is in Example 1. The results are reported in the following table:

| | Composition | GWP | Cap % of 134 | Eff % of 134 (COP) | Ev Full Glide C. | BV cm/s | Hazard Value |
|---|---|---|---|---|---|---|---|
| C1 | R32/R152a/1234ze(E)(0.1/0.2/0.7) | 97 | 102% | 102% | 7.17 | 5.3 | 7 |
| C2 | R32/R152a/1234ze(E)(0.1/0.3/0.6) | 109 | 102% | 102% | 6.16 | 7.6 | 7 |

As can be seen from the results reported above, the compositions which contain 20 percent by weight or greater of HFC-152a each exhibit a detrimentally and unexpectedly high hazard value, notwithstanding that each composition also has a calculated burning velocity of less than 10.

Example 3

Medium Temperature Conditions

This example illustrates the performance of embodiments A1-A3 and B1-B3 of the present invention when used as a replacement for HFC-134a in a Medium temperature refrigerant system. The system is one have an evaporator temperature (ET) of about −10° C., with a degree of superheat at the evaporator outlet of about 5° C., and condenser temperature (CT) of about 5° C., with about 5° C. subcooling. The system has a degree of superheat at the suction line of about 45° C. and an efficiency of about 70%.

The properties of the composition and its performance in the exemplary medium temperature system is observed to be as follows:

| | Composition | GWP | Cap % of 134 | Eff % of 134 (COP) | Ev Full Glide C. | BV cm/s | Hazard Value |
|---|---|---|---|---|---|---|---|
| A1 | R32/R152a/1234ze(E)(0.1/0.15/0.75) | 91 | 101% | 100% | 7.72 | 4.1 | 4 |
| A2 | R32/R152a/1234ze(E)(0.08/0.15/0.77) | 77 | 97% | 100% | 6.88 | 4.0 | 4 |
| A3 | R32/R152a/1234ze(E)(0.06/0.15/0.79) | 64 | 93% | 100% | 5.81 | 3.9 | 4 |
| B1 | R32/R152a/1234ze(E)/R134a(0.09/0.15/0.72/0.04) | 141 | 100% | 100% | 7.07 | 4.6 | 4 |
| B2 | R32/R152a/1234ze(E)/R134a(0.08/0.15/0.73/0.04) | 134 | 98% | 100% | 6.64 | 4.5 | 4 |
| B3 | R32/R152a/1234ze(E)/R134a(0.07/0.15/0.74/0.04) | 127 | 96% | 100% | 6.15 | 4.5 | 4 |

The EV full glide and Hazard Value are each determined as indicated in Example 1 above.

Example 4

Medium Temperature Conditions

This example illustrates compositions within the scope of certain aspects of the present invention, namely compositions B4-B6 which do not contain HFC-152a, but which do contain HFC-134a, using an auto medium temperature system operated is in Example 2. The results are reported in the following table:

| | Composition | GWP | Cap % of 134 | Eff % of 134 (COP) | Ev Full Glide C. | BV cm/s | Hazard Value |
|---|---|---|---|---|---|---|---|
| B4 | R32/1234ze(E)/R134a(0.105/0.85/0.045) | 140 | 100% | 99% | 9.63 | 1.3 | 0.5 |
| B5 | R32/1234ze(E)/R134a(0.1/0.855/0.045) | 137 | 99% | 99% | 9.44 | 1.3 | 0.5 |
| B6 | R32/1234ze(E)/R134a(0.095/0.86/0.045) | 134 | 97% | 99% | 9.23 | 1.3 | 0.5 |

As can be seen from the results reported above, the compositions which do not contain HFC-152a but which contain HFC-134a in accordance with the teachings contained herein show an excellent but unexpected combination of properties, including low GWP, low burning velocity and hazard value and excellent capacity and COP. The glide of such compositions may be higher than desired for some applications, but is acceptable for many applications.

Comparative Example 2C

Medium Temperature Conditions

This example illustrates the performance of the compositions outside the scope of the present invention, namely compositions C1 and C2, using a medium temperature system operated is in Example 2. The results are reported in the following table:

| | Composition | GWP | Cap % of 134 | Eff % of 134 (COP) | Ev Full Glide C. | BV cm/s | Hazard Value |
|---|---|---|---|---|---|---|---|
| C1 | R32/R152a/1234ze(E)(0.1/0.2/0.7) | 96 | 105% | 101% | 7.32 | 5.3 | 7 |
| C2 | R32/R152a/1234ze(E)(0.1/0.3/0.6) | 108 | 104% | 101% | 6.26 | 7.6 | 7 |

As can be seen from the results reported above, the compositions which contain 20 percent by weight or greater of HFC-152a each exhibit a detrimentally and unexpectedly high hazard value, notwithstanding that each composition also has a calculated burning velocity of less than 10.

What is claimed is:

1. A heat transfer composition comprising: (a) from about 85% and about 86% of HFO-1234ze; (b) from about 9.5% and about 10.5% by weight of HFC-32; (c) from about 5 to less than about 20% by weight of HFC-152a; and (d) HFC-134a in an amount of about 4.5% by weight, said composition having a hazard value of less than 7.

2. The heat transfer composition of claim 1 wherein said composition has a GWP of not greater than 150.

3. The heat transfer composition of claim 1 wherein said composition has a GWP of not greater than 100.

4. The heat transfer composition of claim 1 wherein said composition has a hazard value of about 5 or less.

5. The heat transfer composition of claim 1 wherein said composition has a hazard value of less than about 4.

6. The heat transfer composition of claim 1 wherein said composition has a hazard value of not greater than about 2.

7. The heat transfer composition of claim 1 wherein said composition has a burning velocity of less than 10.

8. The heat transfer composition of claim 1 wherein said composition has a capacity relative to HFC-134a under MAC conditions of from about 90% to about 105%.

9. The heat transfer composition of claim 1 wherein said composition has a capacity relative to HFC-134a under MAC conditions of from about 95% to about 101%.

10. The heat transfer composition of claim 1 wherein said composition has a COP relative to HFC134a under MAC conditions of from about 98% to about 102%.

11. The heat transfer composition of claim 1 wherein said composition has a COP relative to HFC134a under MAC conditions of from about 100%.

12. The heat transfer composition of claim 1 wherein said HFO-1234ze consists essentially of trans-HFO1234ze.

13. An air conditioning system comprising a heat transfer composition according to claim 1.

14. A mobile air conditioning system comprising a heat transfer composition according to claim 1.

15. An air conditioning system in a passenger car or for the passenger compartment of a truck comprising a heat transfer composition according to claim 1.

16. The heat transfer composition of claim 1 wherein said composition has an Evaporator Glide of not greater than about 8.

17. The heat transfer composition of claim 1 wherein said composition has an Evaporator Glide of not greater than about 7.

* * * * *